US009432909B2

(12) United States Patent
Svedevall et al.

(10) Patent No.: US 9,432,909 B2
(45) Date of Patent: Aug. 30, 2016

(54) CONTROL NODE FOR A MOBILE COMMUNICATION NETWORK AND A METHOD FOR ALLOCATING RESOURCES IN SAID NETWORK

(75) Inventors: Sofia Svedevall, Linkoping (SE); Bo Ehrenholm, Linkoping (SE); Par Gustavsson, Linkoping (SE); Thomas Walldeen, Linkoping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 170 days.

(21) Appl. No.: 12/867,616

(22) PCT Filed: Feb. 15, 2008

(86) PCT No.: PCT/SE2008/050185
§ 371 (c)(1),
(2), (4) Date: Aug. 13, 2010

(87) PCT Pub. No.: WO2009/102249
PCT Pub. Date: Aug. 20, 2009

(65) Prior Publication Data
US 2010/0330996 A1 Dec. 30, 2010

(51) Int. Cl.
*H04W 48/02* (2009.01)
*H04W 36/14* (2009.01)
*H04W 72/10* (2009.01)

(52) U.S. Cl.
CPC .............. *H04W 48/02* (2013.01); *H04W 36/14* (2013.01); *H04W 72/10* (2013.01)

(58) Field of Classification Search
CPC .... H04W 48/02; H04W 36/14; H04W 72/10
USPC ................... 455/450, 452.1–452.2, 436–444
See application file for complete search history.

(56) References Cited

U.S. PATENT DOCUMENTS

| | | | |
|---|---|---|---|
| 7,236,784 B2 | 6/2007 | Johannesson et al. | |
| 7,646,737 B2 * | 1/2010 | Shi | 370/310 |
| 7,916,696 B2 * | 3/2011 | Noh et al. | 370/331 |
| 8,135,406 B2 * | 3/2012 | Wijayanathan et al. | 455/435.2 |
| 2002/0186710 A1 * | 12/2002 | Alvesalo et al. | 370/468 |
| 2003/0129971 A1 * | 7/2003 | Gopikanth | 455/414 |
| 2005/0075129 A1 * | 4/2005 | Kuchibhotla et al. | 455/552.1 |
| 2005/0227687 A1 | 10/2005 | Drevon | |
| 2006/0166694 A1 * | 7/2006 | Jeong | H04W 48/16 455/525 |
| 2006/0233136 A1 | 10/2006 | Noh et al. | |
| 2006/0291427 A1 | 12/2006 | Park | |
| 2007/0171861 A1 | 7/2007 | Akhtar | |
| 2007/0232338 A1 * | 10/2007 | Niska et al. | 455/500 |
| 2008/0192697 A1 | 8/2008 | Shaheen | |
| 2009/0119392 A1 * | 5/2009 | Bonjour et al. | 709/223 |

FOREIGN PATENT DOCUMENTS

| | | |
|---|---|---|
| JP | 2005522143 A | 7/2005 |
| JP | 2007511141 A | 4/2007 |
| JP | 2007531359 A | 11/2007 |

(Continued)

*Primary Examiner* — Marcos Torres
(74) *Attorney, Agent, or Firm* — Patent Portfolio Builders, PLLC

(57) ABSTRACT

The present invention relates to a control node for a mobile communication network. The control node has means arranged to provide the IMSI of at least some of the currently set up connections and means arranged to allocate resources for the connections based on said IMSI information. The present invention also relates to a method for allocating resources for a connection in a mobile communication network.

37 Claims, 4 Drawing Sheets

| | Cell | home operator | BSC | prioritization scheme |
|---|---|---|---|---|
| 551a | Cell CA | PLMN B | BSCA | 60% PLMN B reserved |
| 551b | Cell CB | PLMN B | BSCB | max 80% PLMN B max 60% PLMN A |
| 551c | Cell CC | PLMN A | BSCB | retainability |
| 551d | Cell CD | PLMN A | BSCA | integrity |
| 551e | Cell CO | PLMN A | BSCA | none |

550
552 553 554 555

(56) References Cited

FOREIGN PATENT DOCUMENTS

| | | |
|---|---|---|
| JP | 2007537633 A | 12/2007 |
| WO | 97/17816 | 5/1997 |
| WO | 2005048632 A1 | 5/2005 |
| WO | 2007/036780 A1 | 4/2007 |

* cited by examiner

Fig 3
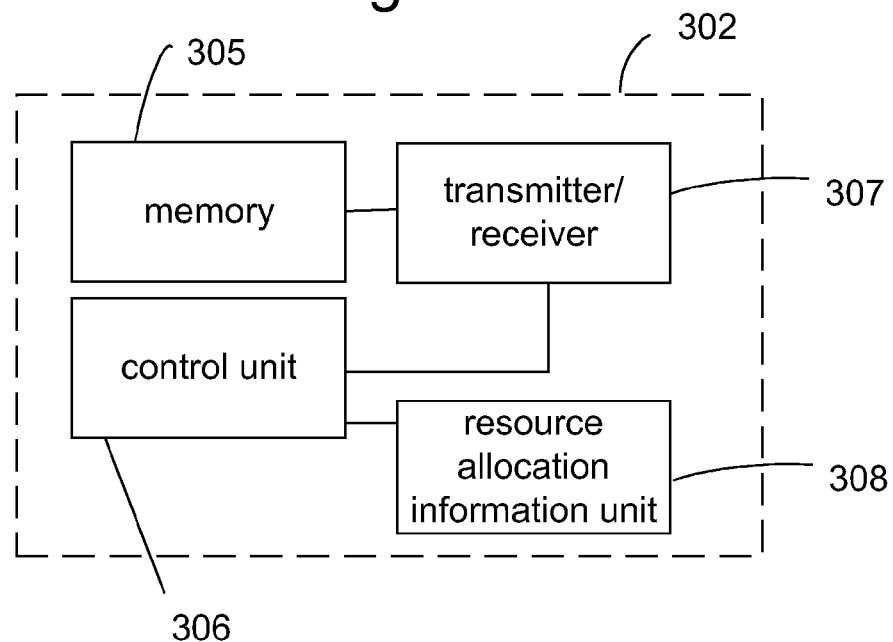
Fig 4
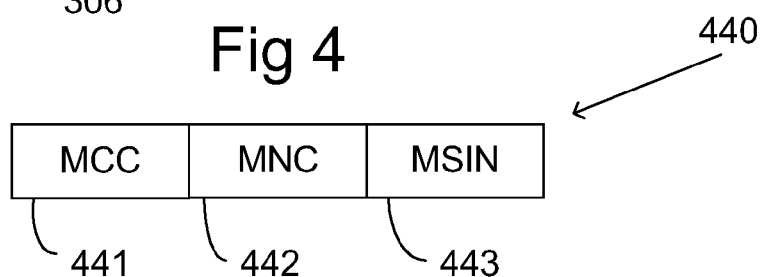
Fig 5
| | Cell | home operator | BSC | prioritization scheme |
|---|---|---|---|---|
| 551a | Cell CA | PLMN B | BSCA | 60% PLMN B reserved |
| 551b | Cell CB | PLMN B | BSCB | max 80% PLMN B max 60% PLMN A |
| 551c | Cell CC | PLMN A | BSCB | retainability |
| 551d | Cell CD | PLMN A | BSCA | integrity |
| 551e | Cell CO | PLMN A | BSCA | none |

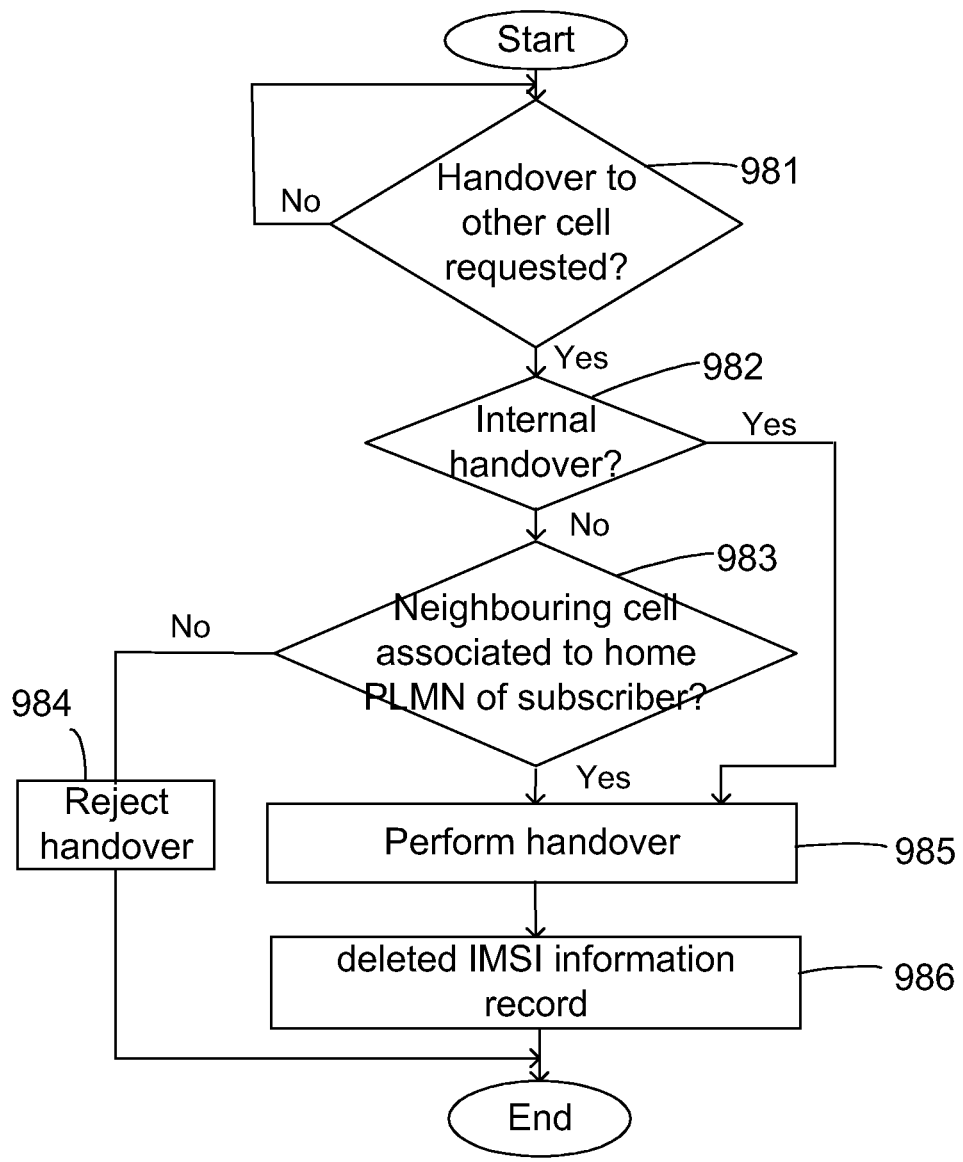

CONTROL NODE FOR A MOBILE COMMUNICATION NETWORK AND A METHOD FOR ALLOCATING RESOURCES IN SAID NETWORK

TECHNICAL FIELD

The present invention generally relates to allocation of resources in a mobile communication network. In particular, it relates to an operation of a control node in said mobile communication network.

BACKGROUND

A GSM network comprises a Base Station Subsystem (BSS) and a Network and Switching Subsystem (NSS). It can also comprise other parts, such as a GPRS core network. The Base Station Subsystem (BSS) is responsible for handling traffic and signaling between mobile units and the Network Switching Subsystem (NSS). The BSS carries out for example transcoding of speech channels, allocation of radio channels to mobile units, paging, quality management of transmission and reception over an Air interface (Um) to the mobile stations. The Network Switching Subsystem (NSS) is also referred to as the GSM core network. It is arranged to carry out switching functions and management of communications between mobile stations and the Public Switched Telephone Network (PSTN).

In GSM networks, operators may share BSS equipment.

U.S. Pat. No. 7,236,784 relates to selecting a public land mobile network (PLMN) from a plurality of available PLMNs. In this disclosure, the mobile stations of a radio network are arranged to select one PLMN from the plurality of available PLMNs.

Further, Inter PLMN (Public Land Mobile Network) handover is not standardized in 3GPP. However, PLMN handovers are still used and works well in several commercial mobile telephony networks.

SUMMARY

One object of the present invention is to improve the allocation of resources in a mobile communication network.

This is addressed by means of a control node for example in the form of a Base Station Controller for a radio communication network, which is arranged to be provided with IMSI information of at least some of the currently set up connections and means arranged to allocate resources for the connections based on said IMSI information. The IMSI information comprises information related to a home operator for each connection. The connection is in one example a circuit switched connection (call) and in another example a packed switched connection.

One advantage of the present invention is that improved decisions can be made by the control node in allocating resources for connections by using the IMSI information so as to gain knowledge about the home operator of each connection handled by the control node. This knowledge can for example be used in prioritizing between connections or in handover decisions between cells.

If the control node uses said IMSI information in association with a request to set up a connection in a cell handled by said control node, allocation of resources for said connection in the cell can be determined based on a prioritization scheme. The prioritization scheme is for example based on the parameters accessibility, retainability or integrity, or a combination of said parameters. The prioritization using the IMSI information and the prioritization scheme enables unequal TRX sharing.

In one embodiment, the control node is arranged to use said IMSI information in handover decisions possibly to cells handled by other control node. Handovers to cells handled by other control nodes can be rejected if the home operator of that cell is another one than that of the connection indicated by the IMSI information.

In one embodiment, the control node is arranged to request the IMSI information and to receive said IMSI information in response to said request whenever a connection (new connection or a connection handed over from another control node) enters one of the cells handled by the control node. The control node is in one example arranged to store said IMSI information at least as long as the connection is maintained and associated to a cell served by the control node. The control node, for example in the form of the Base Station Controller is in one example arranged to request and/or receive said IMSI information by means of the A-interface. The IMSI information is for example included in an A-interface message denoted Common ID. In another example, the control node, for example in the form of the Base Station Controller, is arranged to request and/or receive said IMSI information by means of the Gb-interface.

The information of the IMSI relating to the home operator of a subscriber, to which the IMSI belongs, is comprised in a PLMN or MNC part of the IMSI.

The mobile communication network is for example a GSM network.

The present invention also relates to a Base Station Subsystem in a mobile communication network. The Base Station Subsystem comprises a control node according to the above.

The present invention also relates to a mobile communication network comprising a control node and a switching node. The switching node is for example a Mobile Services Switching Center for a GSM network. The switching node is arranged to provide the IMSI information to the control node for circuit switched connections. The switching node is in one example arranged to transmit said IMSI information when a new circuit switched connection is set up within a cell associated to the control node and/or in association with inter control node handover.

The mobile communication network comprises in one example also a GPRS core network having at least one Service GPRS Support Node (SGSN). The SGSN is arranged to provide the IMSI information to the control node for packet switched connections. The SGSN is in one example arranged to transmit the IMSI information when a new packet switched connection is set up within a cell associated to the control node and/or in association with inter control node handover.

The present invention also relates to a method for allocating resources for a connection in a mobile communication network, wherein resources are allocated for the connection in a cell based on IMSI information.

In one embodiment, the method for allocating resources for a connection in a mobile communication network comprises the steps of providing IMSI information related to the subscriber of the connection in a control node of the mobile communication network, and allocating resources for the connection in the cell based on said IMSI information.

BRIEF DESCRIPTION OF THE DRAWINGS

FIG. 3 is a block scheme schematically illustrating an example of a Base Station Controller in the GSM network of FIG. 1.

FIG. 4 illustrates the contents of an IMSI.

FIG. 5 illustrates an example of a call distribution table in the Base Station Controller.

FIG. 9 is a flow chart schematically illustrating one example of a method for handling handover requests in a GSM network.

DETAILED DESCRIPTION

Figure 1:
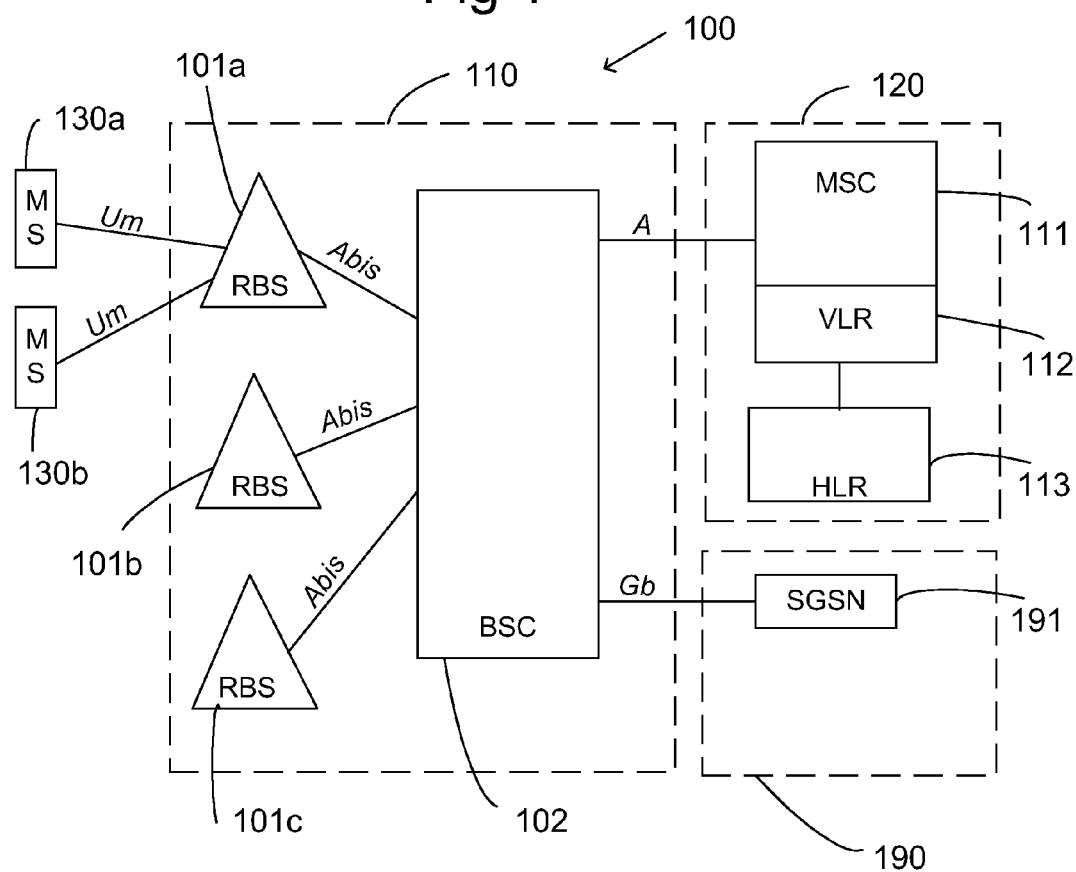
FIG. 1 is a block scheme schematically illustrating an example of a GSM network.

In FIG. 1, a GSM network 100 comprises a Base Station Subsystem (BSS) 110 and a Network and Switching Subsystem (NSS) 120. In the shown example, the GSM network 100 comprises also a GPRS core network 190. The Base Station Subsystem (BSS) 110 is responsible for handling traffic and signaling between mobile units 130a, 130b and the Network Switching Subsystem (NSS) 120. In the shown example, the base Station Subsystem 110 is also responsible for handling traffic and signaling between the mobile units 130a, 130b and the GPRS Core Network 190. The BSS 110 carries out for example transcoding of speech channels, allocation of radio channels to mobile units, paging, quality management of transmission and reception over an Air interface (Um) to the mobile stations 130a, 130b. The Network Switching Subsystem (NSS) 120 is also referred to as the GSM core network. It is arranged to carry out switching functions and management of communications between mobile stations and the Public Switched Telephone Network (PSTN) (not shown). The NSS 120 is deployed by operators of the GSM network.

In the shown figure, the Base Station Subsystem 110 comprises a set of Radio Base Stations (RBS) 101a, 101b, 101c and a Base Station Controller (BSC) 102. The set includes for example 10-100 RBSs. In reality, the Base Station Subsystem (BSS) 110 comprises a plurality of Base Station Controllers (BSCs) 102, each arranged to serve a set of RBSs. The NSS 120 comprises a Mobile Services Switching Center (MSC) 111 coupled to a Visitor Location Register (VLR) 112. The MSC/VLR 111, 112 is connected to a Home Location Register (HLR) 113. The MSC 111 is connected to the BSC 102 of the Base Station Subsystem 110. The connection is in GSM notation denoted A-interface.

In the shown example, the GPRS core network 190 comprises a Serving GPRS Support Node (SGSN) 191. In practice, the GPRS Core Network usually comprises a plurality of Serving GPRS Support Nodes (SGSNs) 191, said SGSNs 191 connects to the remaining part of the GPRS Core Network. The SGSN 191 in the shown example is connected to the BSC 102 of the Base Station Subsystem 110. The connection is in GSM notation denoted Gb.

Figure 2:
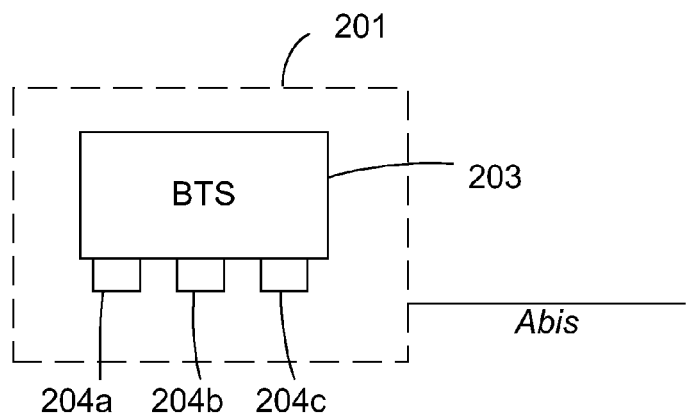
FIG. 2 is a block scheme schematically illustrating an example of a Radio Base Station in the GSM network of FIG. 1.

In FIG. 2, a Radio Base Station 201 includes a Base Transceiver Station (BTS) 203. An interface between the Base Transceiver Station 203 and the Base Station Controller (BSC) is referred to as Abis. The BTS 203 can measure signal strength and transmission quality on the UL Traffic Channel (TCH) (normally Um in FIG. 1). The BTS can receive measurement reports from each one of a plurality of mobile stations. The BTS is arranged to convey the measurement report information to the BSC (via the RBS).

The BTS 203 comprises one or a plurality of transceivers (TRXs) 204a, 204b, 204c. Each transceiver (TRX) 204a, 204b, 204c transmits and receives according to the GSM standards. Today, the GSM standards prescribe eight TDMA time slots per radio frequency. In using a plurality of transceivers (TRXs) 204a, 204b, 204c, the radio base station (RBS) can serve a plurality of frequencies and a plurality of sectors within a cell served by the Radio Base Station (RBS).

Operators may share BSS equipment, including the TRXs of a BTS 203.

In FIG. 3, a Base Station Controller 302 for a GSM network comprises a memory 305 arranged to store International Mobile Subscriber IDs (IMSI) of at least some of the currently set up connections. The connections comprise for example circuit switched connections and/or packet switched connections. In one example, the IMSI for circuit switched calls is provided from the Mobile Services Switching Center (MSC) 111. The BSC 302 is in this example arranged to receive said IMSI information over the A interface by means of a transmitter/receiver 307. The received IMSI information is then stored in the memory 305. The IMSI for packet switched data is provided from the GPRS core network 190. The BSC 302 is in this example arranged to receive said IMSI information over the Gb interface by means of the transmitter/receiver 307. The BSC 302 comprises a control unit 306 arranged to determine whether resources for a connection can be allocated using the IMSI information. In one example, the control unit 306 is arranged to request the IMSI information in association with setting up a new connection within a cell associated to the BSC 302 and/or in association with inter Base Station Controller handover (i.e. handover of a connection from another BSC). The request is transmitted by means of the transmitter/receiver 307. The IMSI information is then received in response to said request. In one example, the IMSI information received from the MSC 111 is included in the A-interface message denoted Common ID.

The control unit 306 is arranged so as to control storing of the IMSI of all subscribers served by the BSC in the memory 305. The purpose is to provide a list of all subscribers served by the BSC 302, said list comprising information related to the home operator of each subscriber. In one example, the control unit is arranged to control removal of IMSIs of the memory 305 for mobile units not longer handled by the BSC. In detail, the control unit 305 is arranged to provide the IMSI of each connection setup. Connection setups are herein referred to as setups of new connections and setups of connections handed over from other BSC. In the case of setting up new connections, the mobile units 130a, 130b are arranged to send a connection request. The connection request is transferred to the Base Station Controller 102. The control unit 305 is in the herein described example upon reception of such request arranged to request the IMSI and store it in the memory 305. In one example, wherein the requested connection is a circuit switched connection, the control unit 305 is arranged to request the IMSI from the Mobile Services Switching Centre (MSC). In an alternative example, wherein the connection is a packet switched connection, the control unit 305 is arranged to request the IMSI from the SGSN 191. Further, when the BSC 102 is informed, by means of the NSS 120, that a call is handed over from another BSC, the control unit 306 is arranged to request the IMSI from the Mobile Services Switching Centre (MSC) or GPRS Core Network associated to that connection, and store it in the memory 305.

In an alternative example (not shown), the Mobile Service Switching Centre (MSC) and/or GPRS Core Network is arranged to transmit the IMSI to the dedicated Base Station Controller (BSC) whenever it has detected a connection setup (i.e. a setup of a new connection and/or a setup of a connection handed over from another BSC). In accordance with this example, the herein described procedure in the BSC for requesting the IMSI is superfluous.

The control unit 306 is arranged to determine whether resources for a connection can be allocated based on said IMSI information in the memory 305, and based on information in a resource allocation information unit 308, as will be described in relation to FIG. 5.

In one example, the determination of whether resources for a circuit switched connection (in the following referred to as a call) can be allocated involves prioritizing operators based on the IMSI information in at least setup of calls (new calls and/or handed-over calls). In detail, the priority handling relates to prioritizing operators down to TRX level. This means that each TRX can be shared between operators down to time slot level in accordance with a predetermined prioritization. For example, for one cell (a cell is defined as a geographical area handled by one RBS and one specific operator), the control unit is arranged to determine an operator for each new call in accordance with the predetermined prioritization. In one example, one of the operators has higher accessibility to the cell. That operator then has a percentage reserved or priority at queuing in the cell. For example, the control unit is arranged to prioritize the calls such that that one or a plurality of operators have a percentage of the capacity reserved, e.g. 60% (or another chosen figure) of the capacity can be reserved for the operator A. Alternatively, one or a plurality of operators have a maximum capacity for use, e.g. max 80% (or another chosen figure) of the capacity is allowed to be used by the operator A and/or max 60% (or) another figure of the capacity is allowed to be used by an operator B.

Alternatively, one of the operators is reserved a higher retainability in the cell. Fore example, if there is no capacity left, a call for the home operator may steal a channel already used by a call for another operator.

In yet another example, one of the operators is attained a better integrity in the cell. Accordingly, HR (Half Rate channel) will then be less often used for that operator, or not at all.

In using the prioritization scheme according to the above, it is possible to control sharing of the TRXs in an unequal manner when several operators share BSS equipment. This can for example be a pre-requisite if two operators of different sizes decide to start BSS sharing, or if either of the operators is remaining as the main service deliverer in a certain area. The pricing (the share of investment in shared equipment) could then be based on the inequality.

The unequal sharing can be used for accessibility, retainability or integrity.

Individual eMLPP (enhanced Multi-Layer Priority and Pre) priorities can be applied on top of the PLMN priority. The eMPLL priorities are stored in the HLR.

As discussed above, the PLMN information of the IMSI can also be used by the BSC 302 for scheduling of packet switched data. Therefore, the TCHs can be shared also for packet switched data.

In another example, the distribution of connections (e.g. calls) between different operators involves handling of the calls in handovers between cells, which will be described more in detail in relation to FIGS. 5 and 6.

In FIG. 4, an IMSI 440 comprises a Mobile Country Code (MCC) field 441, a Mobile Network Code (MNC) field 442 and a subscriber ID (MSIN) field 443. The Mobile Country Code (MCC) and the Mobile Network Code (MNC) form a public land mobile network (PLMN). The MNC part of the IMSI and the PLMN identifies the operator.

In FIG. 5, a connection resource allocation table 550 of the resource allocation information unit 308 comprises a plurality of records 551*a*-551*e*, each record being associated to one cell. In one example, the table comprises records related to each cell of the BSC and cells adjacent said BSC. The records comprise information for making decisions regarding allocating resources to home operators of subscribers within a cell and handover decisions when connections are moved from one cell to another. Each record comprises a cell information field 552 identifying the cell, a home PLMN field 553 identifying a home PLMN for that cell (i.e. a home operator for a cell), a BSC field 554 identifying the BSC to which the cell is associated, and a prioritization scheme field 555 for described the above described prioritization scheme or scheduling information for packet switched data.

Today, each BSC possess information identifying the cells which it serves and also information identifying adjacent cells. Further, each cell possesses information related to the home PLMN of each cell. The BSC can also possess information related to the prioritizing schemes of the cells and/or packet switched data scheduling information. The prioritization schemes have been specified by the operator by his choice. For the sake of simplicity in this description, the resource allocation information, namely cell identity, cell home operator, responsible BSC and possibly the prioritization scheme, is gathered in the table 550. However, the resource allocation information does not need to be gathered in a table. It is only of relevance that the BSC possesses said information.

Figure 6:
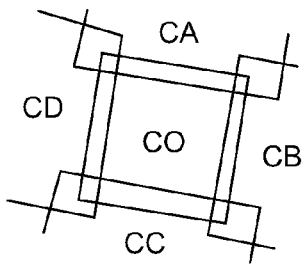
FIG. 6 illustrates the geographical relation between the cells of the call distribution table in FIG. 5.

In FIG. 6, the geographical relations are illustrated between the cells of the table 550. We herein refer the cell CO as the cell in which a mobile unit is presently present and from which cell CO potential handovers to neighbouring cells CA, CB, CC and CD are discussed. If the mobile unit 130 is close to or in a geographical area covered by the cell CA, a handover can be proposed by the BSC serving cell CO. Information is retrieved from the table related to the identities of the BSCs of the cells CO and CA. A comparison shows that the cells CO and CA belong to the same BSC, namely BSCA in the table 308. A handover from the cell CO to the neighbouring cell CA is then regarded as internal, and an internal handover can be allowed. However, it is not evident that a handover will be allowed anyway. In one example, a handover is accepted if a comparison between the home PLMN (home operator) of the subscriber of the mobile unit 130 and the home PLMN (home operator) of the cell CA shows that the home PLMN of the cell CA is the same as the home PLMN of the subscriber. However, if the comparison on the other hand shows that the home PLMN of the cell CA is not the same as the PLMN of the subscriber, then a handover decision can be based on for example load sharing priorities of the cell CA. In an alternative example, the prioritization scheme associated to the cell CA of the table 550 is used for prioritization of handovers which can be allowed. Accordingly, the subscriber is allowed in cell CA based on the criterion that 60% (or another chosen figure) of the capacity (or connections) are reserved to subscribers having the operator denoted PLMN B as home operator. Accordingly, if the subscriber has a home PLMN other than PLMN B, handover can be accepted only if there is capacity available within the remaining 40% not reserved for the home operator PLMN B. If on the other hand, the subscriber has PLMN B as home operator, then handover can be accepted if there is any capacity available.

If the mobile unit 130 is close to or in a geographical area covered by the cell CB, a handover can be proposed by the BSC serving cell CO. Information is then retrieved from the table 550 related to the identities of the BSCs of the cells CO and CB. A comparison shows that the cells CO and CB belong to different BSCs. A handover from the cell CO to the neighbouring cell CB is then regarded as external. An external handover can only be accepted under certain conditions, as will be described below. If the comparison shows that the home PLMN of the cell CB is the same as the PLMN of the subscriber, then a handover can be accepted.

The prioritization scheme for the cell CB in the table 550 is in one example implemented in the receiving BSC denoted BSCB. Accordingly, the receiving BSC denoted BSCB is arranged to allow the subscriber in cell CB based on the criterion that a maximum of 80% (or another chosen figure) of the subscribers (or capacity) are allowed to belong to the home PLMN B and a maximum of 60% (or another chosen figure) of the subscribers are allowed to belong to the home PLMN A. Accordingly, if the subscriber has PLMN B as home PLMN, then the connection can be handed over if less than 80% of the capacity of the cell is presently allocated to subscribers having PLMN B as home operator, and if capacity is available. Further, if the subscriber has PLMN A as home PLMN, then the connection can be handed over if less than 60% of the capacity of the cell is presently allocated to subscribers having PLMN A as home operator, and if capacity is still available within the cell CB.

A handover between the cells CO and CB will not be accepted if a comparison between the home PLMN of the subscriber of the mobile unit 130 (obtained from the memory 305) and the home PLMN of the cell CB shows that the home PLMN of the cell CB is not the same as the PLMN of the subscriber. However, if the mobile unit 130 is also close to or in a geographical area covered by the cell CC, which belongs to another Base Station Controller (namely BSCB) than cell CO, but to the same operator as the subscriber associated to the mobile unit, the responsibility for that mobile unit can be forced into the cell CC under the assumption that the receiving BSC denoted BSCB accepts the responsibility for the mobile unit. From there, the connection can then be internally handed over from the cell CC to the cell CB under the control of the new Base Station Controller BSCB serving the cells CB and CC.

If the mobile unit 130 is close to or in a geographical area covered by the cell CD, a handover can be proposed by the serving cell CO. In the table of FIG. 5, the prioritization scheme of cell CC is based on retainability. Accordingly, the home operator PLMN A of cell CC has priority for stealing channels from other operators. Information is retrieved from the table 550 related to the identities of the BSCs of the cells CO and CD. A comparison shows that the cells CO and CD belong to the same BSC, namely BSCA in the table 550. A handover from the cell CO to the neighbouring cell CD is then regarded as internal, and an internal handover can be allowed. The prioritization scheme of the table 550 is in one example used for prioritization of handovers which can be allowed. Accordingly, the subscriber is allowed in cell CD based on an integrity criterion. So, for example, if the connection in the form of a call belongs to operator A, it will get a FR (Full Rate) channel with good speech quality/ integrity and otherwise it will get a HR (Half Rate) channel with less good speech quality/integrity. A handover can be accepted if there is any capacity available. So, for example, if the connection in the form of a packet switched connection belongs to operator A, it will get a higher guaranteed bit rate compared to a case wherein the packet switched connection belongs to another operator. A handover can be accepted if there is any capacity available.

Figure 7:
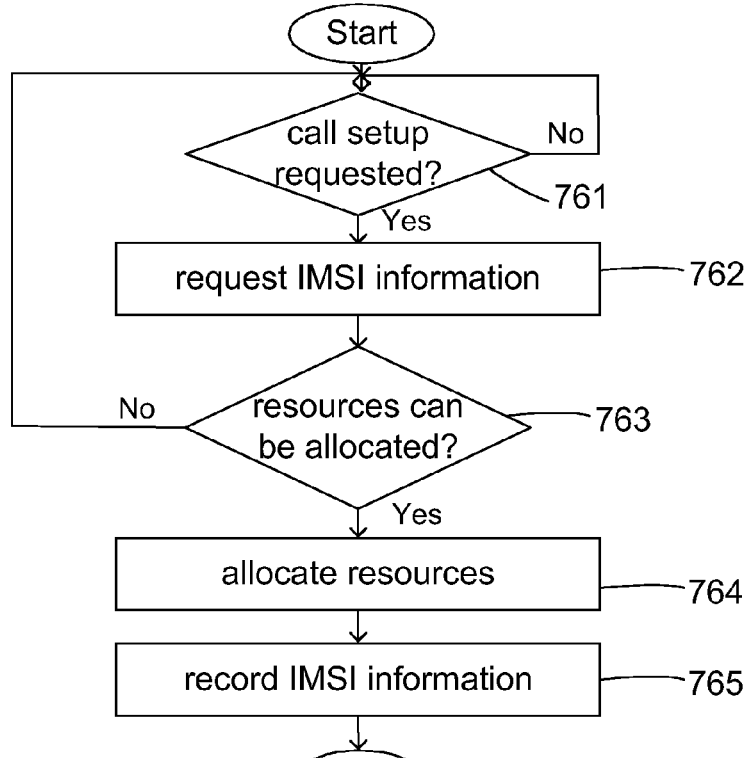
FIG. 7 is a flow chart schematically illustrating an example of a method for handling call setup requests in a cell in a GSM network.

In FIG. 7, a method for allocating resources in a GSM network generally comprises allocating resources for the connection in a cell based on IMSI information. In the example of the figure, the allocation of resources is evaluated when a setup of a new connection associated to a subscriber is requested and when a set up of a handed over connection associated to the subscriber is requested from another cell. In detail, the method comprises a step 761 of detecting when a connection setup is requested, either by means of a handover from another cell or a setup of a new connection. In a next step 762, the Base Station Controller serving the cell in question requests IMSI information for the subscriber requesting setup of a connection, if not already available in the BSC. The IMSI is then used in an evaluation step 763, wherein it is evaluated whether resources for setting up the connection can be allocated. If resources can be allocated, this is done in an allocation step 764. A record of the IMSI of the new subscriber is then saved by the Base Station Controller in a saving step 765, if not already saved. Accordingly, the IMSI for all connections (new connections and handed over connections) within the cell are recorded, for all cells handled by the BSC. In the example, wherein the MSC automatically transmits the IMSI, the request step 762 can be omitted.

Figure 8:
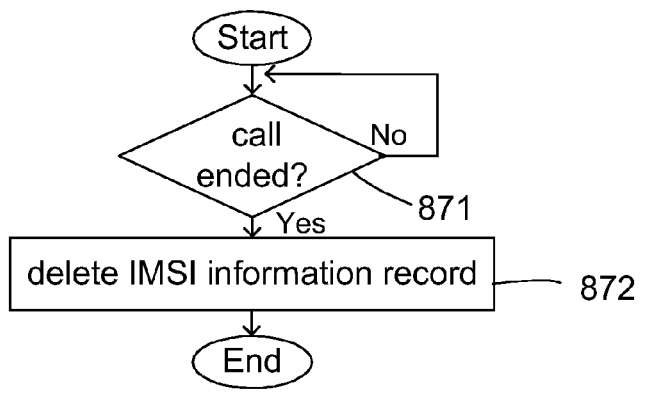
FIG. 8 is a flow chart illustrating handling of closing calls.

In FIG. 8, the IMSI records are deleted when a connection has been ended. Thereby, only records of the IMSIs for the presently setup connections within the cells are kept by the BSC. In detail, the Base Station Controller detects in a detection step 871 if a connection has been ended and deletes the record related to said connection in a deletion step 872.

In FIG. 9, a procedure for allocating resources in a request for handover to another cell in the GSM network is described. In general, the allocating of resources for the connection in the new cell comprises making a handover decision based on the IMSI. In detail, a request of a handover to another cell is detected in a detection step 981. When a handover request has been detected, it is in a next step 982 determined whether an intended handover is between two cells associated to the same Base Station Controller or between two cells associated to different Base Station Controllers. If the intended handover is between two cells associated to the same Base Station Controller, then an internal handover is requested. If on the other hand the intended handover is between two cells associated to different Base Station Controllers, then an external handover is requested. If an internal handover is requested, resources can be allocated for the connection in the new cell provided that capacity is available in the new cell. The determination of whether capacity is available is performed by the new cell for example based on above described prioritization schemes. The prioritization of connections is for example based on accessibility, retainability and/or integrity. If capacity is available in the new cell, the connection is handed over in a handover step 985. The IMSI record related to the cell which handed over the connection is deleted in a deletion step 986. If the handover is determined to be external, then the handover is rejected in a rejection step 984 if a home PLMN of the receiving cell is different than the operator given by the IMSI information associated to the connection for which handover is requested (step 983). If it on the other hand is determined in the step 983 that the external handover is requested to a neighbouring cell having the same home PLMN as that given by the IMSI associated to the connection for which handover is requested, then handover can be performed in the handover step 985. However, in one example, resources are allocated for the connection in the new cell provided that capacity is available in the new cell. The determination of whether capacity is available is performed by the new cell for example based on above described prioritization schemes. The prioritization of connections is for example based on accessibility, retainability and/or integrity. If capacity is available in the new cell and the connection is handed over, then the IMSI record related to the cell which handed over the connection is deleted in the deletion step 986.

The description above is adapted for allocation of resources in a GSM network. However, the manner of allocating resources as described herein is applicable also in other mobile communication networks.

The invention claimed is:

1. A method for sharing radio resources in a cell amongst multiple operators, wherein the method is implemented by a control node and comprises:
   determining that a mobile terminal connection is a candidate to be handed over to the cell;
   obtaining International Mobile Subscriber Identity (IMSI) information for the mobile terminal connection;
   based on the IMSI information, identifying a home operator for the mobile terminal connection as being an operator of a core network to which the connection is connected;
   determining whether and/or which of the shared radio resources in the cell are to be allocated to the mobile terminal connection for handover to the cell, based on the home operator identified for that connection and one or more rules that give different ones of the multiple operators different priorities to the shared radio resources in the cell; and
   allocating one or more of the shared radio resources in accordance with said determining whether and/or which of the shared radio resources in the cell are to be allocated,
   wherein, when the home operator identified for the mobile terminal connection has a lower priority to the shared radio resources than a competing operator that shares those radio resources, said allocating comprises allocating one or more of the shared radio resources in the cell to the mobile terminal connection provided that those radio resources are not needed for a mobile terminal connection having the competing operator as its home operator.

2. The method of claim 1, wherein the shared radio resources comprise radio resources used by a shared base station transceiver for transmitting in the cell, said shared transceiver unequally shared amongst said different operators.

3. The method of claim 2, wherein the shared radio resources comprise time slots within which the shared base station transceiver transmits in the cell.

4. The method of claim 1, wherein a base transceiver station comprises one or more transceivers for serving the cell, wherein the shared radio resources comprise time slots within which each transceiver transmits in the cell, and wherein each transceiver is shared between the different operators down to a time slot level in accordance with the one or more rules.

5. The method of claim 1, wherein the shared radio resources comprise radio channels with different qualities, rates, or integrity; and wherein the one or more rules give different operators different priorities to any given one of said radio channels.

6. The method of claim 1, wherein the one or more rules reserve different percentages of the shared radio resources for different respective operators sharing equipment of a base station system, or limit the different operators to using different maximum percentages of the shared radio resources.

7. The method of claim 6, wherein the cell is a target cell of the handover and wherein the method further comprises, selecting the one or more rules from different sets of rules depending on whether or not the handover is an inter-base station controller handover, at least one of the sets of rules applies for an inter-base station controller handover and at least one of the sets of rules applies for an intra-base station controller handover.

8. The method of claim 1, wherein said determining comprises determining whether radio resources in the cell already allocated to a different mobile terminal connection are to be re-allocated to said mobile terminal connection, based on home operators identified for those connections and the one or more rules that allow connections of one operator to steal radio resources already allocated to connections of a different operator.

9. The method of claim 1, wherein said obtaining comprises receiving said IMSI information in association with an inter Base Station Controller handover or an inter PLMN handover.

10. The method of claim 1, wherein obtaining IMSI information comprises requesting the IMSI information in association with an inter Base Station Controller handover, and receiving said IMSI information in response to said request.

11. The method of claim 1, wherein obtaining IMSI information comprises receiving the IMSI information from a network node located in a core network.

12. The method of claim 11, wherein the network node located in the core network is a Mobile Service Switching Center (MSC).

13. The method of claim 11, wherein the network node located in the core network is a Serving GPRS Support Node (SGSN).

14. The method of claim 1, wherein said allocating one or more of the shared radio resources is based on a PLMN part or an MNC part of said IMSI information.

15. The method of claim 1, wherein said determining comprises deciding whether the handover is to occur based on said IMSI information.

16. The method of claim 15, wherein said deciding comprises rejecting the handover as an external handover, if the cell to which the mobile terminal connection is to be handed over is associated with a different home PLMN than that indicated by the IMSI information.

17. The method of claim 1, wherein said obtaining comprises receiving the IMSI information over an A-interface for circuit switched call connections, or a Gb-interface for packet switched data connections.

18. The method of claim 1, wherein the one or more rules reserve for at least two of the multiple operators sharing the shared radio resources in the cell a non-zero percentage of the shared radio resources or limit each of the at least two operators to using a non-zero maximum percentage of the shared radio resources.

19. The method of claim 1, wherein the one or more rules give different ones of the multiple operators that share the radio resources in the cell different priorities to those shared radio resources.

20. The method of claim 1, wherein the shared radio resources comprise resources over an air interface in the cell.

21. A control node for sharing radio resources in a cell amongst multiple operators, said node comprising:
   a communication interface for obtaining International Mobile Subscriber Identity (IMSI) information for a mobile terminal connection;
   memory configured to store the IMSI information; and
   a control circuit operatively associated with the communication interface and memory, and configured to:
      determine that a mobile terminal connection is a candidate to be handed over to the cell;
      based on the IMSI information, identify a home operator for the mobile terminal connection as being an operator of a core network to which the connection is connected;
      determine whether and/or which of the shared radio resources in the cell are to be allocated to the mobile terminal connection for handover to the cell, based on the home operator identified for that connection and one or more rules that give different ones of the multiple operators different priorities to the shared radio resources in the cell; and
      allocate one or more of the shared radio resources in the cell in accordance with the determining of whether and/or which of the shared radio resources in the cell are to be allocated,
   wherein, when the home operator identified for the mobile terminal connection has a lower priority to the shared radio resources than a competing operator that shares those radio resources, said control circuit is configured to allocate one or more of the shared radio resources in the cell to the mobile terminal connection provided that those radio resources are not needed for a mobile terminal connection having the competing operator as its home operator.

22. The control node of claim 21, wherein the shared radio resources comprise radio resources used by a shared base station transceiver for transmitting in the cell, said shared transceiver unequally shared amongst said different operators.

23. The control node of claim 22, wherein the shared radio resources comprise time slots within which the shared base station transceiver transmits in the cell.

24. The control node of claim 21, wherein a base transceiver station comprises one or more transceivers for serving the cell, wherein the shared radio resources comprise time slots within which each transceiver transmits in the cell, and wherein each transceiver is shared between the different operators down to a time slot level in accordance with the one or more rules.

25. The control node of claim 21, wherein the shared radio resources comprise radio channels with different qualities, rates, or integrity; and wherein the one or more rules give different operators different priorities to any given one of said radio channels.

26. The control node of claim 21, wherein the one or more rules reserve different percentages of the shared radio resources for different respective operators sharing equipment of a base station system, or limit the different operators to using different maximum percentages of the shared radio resources.

27. The control node of claim 26, wherein the cell is a target cell of the handover and wherein the control node is further configured to select the one or more rules from different sets of rules depending on whether or not the handover is an inter-base station controller handover, at least one of the sets of rules applies for an inter-base station controller handover and at least one of the sets of rules applies for an intra-base station controller handover.

28. The control node of claim 21, wherein said determining comprises determining whether radio resources in the cell already allocated to a different mobile terminal connection are to be re-allocated to said mobile terminal connection, based on home operators identified for those connections and the one or more rules that allow connections of one operator to steal radio resources already allocated to connections of a different operator.

29. The control node of claim 21, wherein said obtaining comprises receiving said IMSI information in association with an inter Base Station Controller handover or an inter PLMN handover.

30. The control node of claim 21, wherein obtaining IMSI information comprises requesting the IMSI information in association with an inter Base Station Controller handover, and receiving said IMSI information in response to said request.

31. The control node of claim 21, wherein obtaining IMSI information comprises receiving the IMSI information from a network node located in a core network.

32. The control node of claim 31, wherein the network node located in the core network is a Mobile Service Switching Center (MSC).

33. The control node of claim 31, wherein the network node located in the core network is a Serving GPRS Support Node (SGSN).

34. The control node of claim 21, wherein the allocation of one or more of the shared radio resources is based on a PLMN part or an MNC part of said IMSI information.

35. The control node of claim 21, wherein the one or more rules reserve for at least two of the multiple operators sharing the shared radio resources in the cell a non-zero percentage of the shared radio resources or limit each of the at least two operators to using a non-zero maximum percentage of the shared radio resources.

36. The control node of claim 21, wherein the one or more rules give different ones of the multiple operators that share the radio resources in the cell different priorities to those shared radio resources.

37. The control node of claim 21, wherein the shared radio resources comprise resources over an air interface in the cell.

\* \* \* \* \*